United States Patent [19]

Palumbo et al.

[11] 4,415,629

[45] Nov. 15, 1983

[54] INSULATED CONDUCTOR

[75] Inventors: Anthony J. Palumbo, Hermitage; Henry A. Pearce, Jr., Stoneboro; Curtis L. Moore, Hermitage, all of Pa.

[73] Assignee: Electric Power Research Institute, Inc., Palo Alto, Calif.

[21] Appl. No.: 360,737

[22] Filed: Mar. 22, 1982

[51] Int. Cl.³ .............................................. D02G 3/00
[52] U.S. Cl. ................................... 428/375; 428/380; 427/27; 174/110 R; 174/110 E; 428/383
[58] Field of Search ...................... 428/375, 380, 383; 174/110 R, 110 E, 126 C; 427/27

[56] References Cited

U.S. PATENT DOCUMENTS 2,593,922  4/1952  Robinson et al. .............. 174/110 R
3,337,471  8/1967  Levy et al. .

FOREIGN PATENT DOCUMENTS 994408  7/1965  United Kingdom ............ 174/110 E

Primary Examiner—Marion McCamish
Assistant Examiner—Beverly K. Johnson
Attorney, Agent, or Firm—R. D. Fuerle

[57] ABSTRACT

Disclosed is a method of making an insulated conductor by coating a conductor with a triazole and applying the insulation over the triazole coating. The triazole is preferably benzyltriazole or tolyltriazole. It can be applied dissolving the triazole in water, immersing the conductor in the solution and evaporating the water. The invention is particularly useful with epoxy powder coatings on copper conductors which are used in perchloroethylene containing insulating fluid.

10 Claims, 1 Drawing Figure

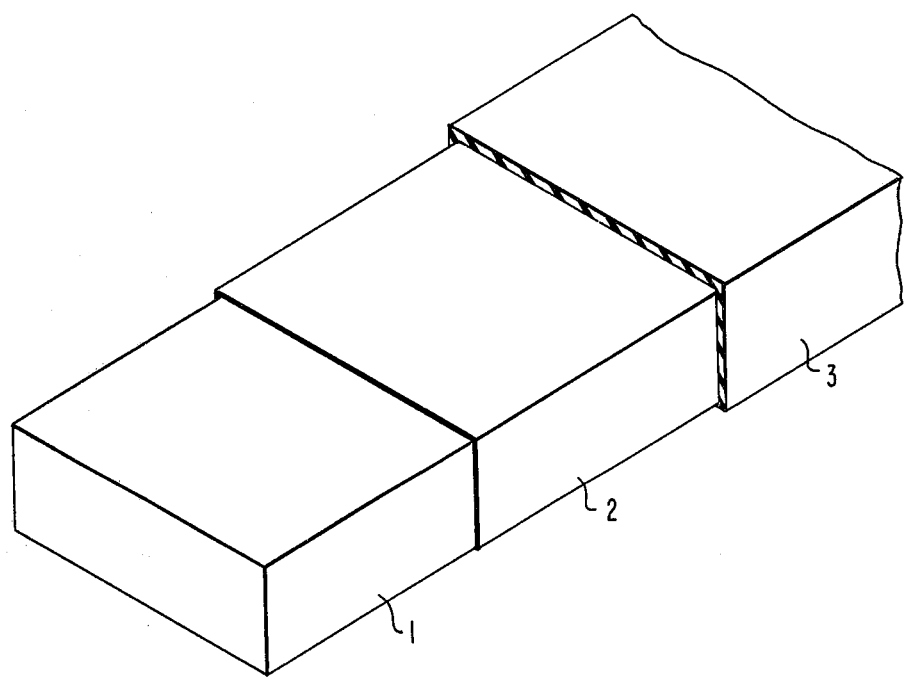

INSULATED CONDUCTOR

BACKGROUND OF THE INVENTION

Because polychlorinated biphenyls (PCB's) have been found to be environmental pollutants, their use as an insulating fluid in transformers, capacitors, and other electrical equipment is no longer permitted. One of the fluids which has been substituted for the PCB's is perchloroethylene, $C_2Cl_4$. Perchloroethylene has been chosen as a substitute for PCB's because it has good dielectric properties, is non-flammable, and remains fluid at low temperatures. One of the difficulties encountered in the use of perchloroethylene, however, has been the tendency of insulation to blister in the presence of that fluid. This is especially a problem with epoxy powder coatings which are applied to copper wire. The blistering is regarded as a serious problem in the use of perchloroethylene as it can lead to the electrical failure of the apparatus.

SUMMARY OF THE INVENTION

We have discovered that insulated conductors can be made, even copper conductors insulated with epoxy powder, which will not blister in perchloroethylene. This is accomplished by applying a coating of a triazole to the conductor prior to insulating the conductor. Only a very small amount of the triazole is used and the adherence of the insulation to the conductor and its electrical resistance are not adversely affected.

PRIOR ART

U.S. Pat. No. 3,337,471 discloses the inhibition of copper corrosion by the addition of triazoles to a perchloroethylene dry-cleaning fluid.

U.S. Pat. No. 3,359,209 discloses dissolving a glycidyl ether in perchloroethylene to inhibit the corrosion of copper.

U.S. Pat. No. 3,367,907 discloses stabilizing polymers in the presence of copper by the addition of azimidobenzene to the polymer.

DESCRIPTION OF THE INVENTION

The accompanying drawing is an isometric view in section of a certain presently preferred embodiment of a coated conductor according to this invention.

In the drawing, a conductor 1 is coated with a triazole 2. Insulation 3 coats the conductor over the triazole.

While this invention can be applied to conductors of almost any metal, it is particularly useful with conductors made of copper or copper alloys as most of the problems of insulation blistering have occurred with these metals. The conductor can be of any size or shape such as various electrical components or round or rectangular wire.

Triazoles are compounds having the general formula:

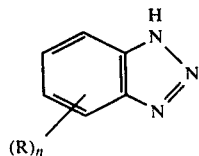

where R is an alkyl group having 1 to 6 carbon atoms and n is 0 to 4. Preferably, R is methyl and n is 0 or 1 as these triazoles work well and are commercially available. For these reasons the preferred triazoles are benzotriazole (n=0) and tolyltriazole (R=$CH_3$ and n=1). Other triazoles which can be used include 4,5,6,7-tetrachloro-1,2,3-benzotriazole, 7-nitro-1,2,3-benzotriazole, 7-hydroxy-1,2,3-benzotriazole, 1-methyl-1,2,3-benzotriazole, 2-methyl-1,2,3-benzotriazole, 3,4,5 or 7-methyl-1,2,3-benzotriazole, and 4,5-dimethyl-1,2,3-benzotriazole. The triazole is most conveniently applied to the conductor by immersing the conductor in a solution of the triazole, then permitting the solvent in the solution to evaporate. A preferred solution is one-half percent solution in water as that results in an adequate amount of triazole being applied to the conductor, and water is inexpensive and non-toxic. The resulting triazole coating on the conductor is typically only about 40 to about 50 angstroms thick, but that is adequate to prevent blistering of the insulation.

Any type of insulation can be applied over the triazole coating on the conductor including powder, enamel, varnish, other synthetic resinous organic coatings, or paper. The preferred insulation is an epoxy resin which is applied by electrostatic powder coating. Electrostatic powder coating is a technique well-known in the art; it is described in U.S. Pat. No. 4,051,809, herein incorporated by reference. An epoxy powder coating is the preferred insulation as the advantages of this invention are realized to the greatest extent with that type of coating. Typically, the insulation is about 1 to 10 mils thick.

The insulated conductor can then be used in a dielectric fluid which contains $C_2Cl_4$ and the insulation will not blister. Such fluids include pure perchloroethylene and mixtures of perchloroethylene with mineral oil, silicone oil, or other hydrocarbon or ester insulating fluids. The insulated conductor and fluid is used in fluid-filled electrical apparatus such as transformers, capacitors, switches, tap changers, and circuit breakers.

The following example further illustrates this invention.

EXAMPLE

A $\frac{3}{4}$ to 1% by weight solution of tolyltriazole in water was prepared. Eight six-inch pieces of rectangular pure copper wire 0.129 by 0.365 inches were cut, and four of the pieces were immersed in the tolyltriazole solution and dried. All eight pieces of the copper wire were then electrostatically powder coated with a bisphenol A epoxy powder sold by 3M under the trade designation "XR-5255". ("XR-5256" can also be used.) The coated wires were heated at 150° C. for one hour to melt and cure the insulation on the wires. The resulting coatings were 3 mils thick. The two sets of samples were placed in separate tanks containing 2400 ml. of perchloroethylene. After 30 days in the tanks at 125° C., the coatings were examined for peeling and cracking and the perchloroethylene fluid was tested for contamination. The insulation on all of the samples which had been treated with tolyltriazole was intact while the insulation on the untreated samples blistered and peeled off. The fluids in both tanks were normal.

We claim:

1. A method of making an insulated conductor comprising:
   (1) coating said conductor with a aryl-triazole; and
   (2) applying an insulating coating to said coated conductor.

2. A method according to claim 1 wherein said triazole is selected from the group consisting of benzotriazole, tolyltriazole, and mixtures thereof.

3. A method according to claim 1 wherein said conductor is coated with said triazole by forming a water solution of said triazole, applying said solution to said conductor, and evaporating said water.

4. A method according to claim 1 wherein said conductor is insulated with an epoxy resin which is applied by electrostatic powder coating.

5. A method according to claim 1 wherein said conductor is copper or a copper alloy.

6. An insulated conductor having a coating of a aryltriazole in between a coating of insulation and said conductor.

7. An insulated conductor according to claim 6 wherein said insulation is about 1 to about 10 mils thick.

8. An insulated conductor according to claim 6 wherein said conductor is copper or a copper alloy.

9. An insulated conductor according to claim 6 wherein said triazole is selected from the group consisting of benzotriazole, tolyltriazole, and mixtures thereof.

10. An insulated conductor according to claim 6 wherein said insulation is a powder coated epoxy.

* * * * *